UNITED STATES PATENT OFFICE.

ALEXANDER APPLEBY, OF BROWNFIELD, MAINE.

IMPROVED MODE OF PREPARING TAN-BARK FOR USE.

Specification forming part of Letters Patent No. 68,335, dated September 3, 1867.

*To all whom it may concern:*

Be it known that I, ALEXANDER APPLEBY, of Brownfield, in the county of Oxford and State of Maine, have invented a new and useful Process for Preparing (for the use of tanners or for transportation) Hemlock or other Bark containing Tannin; and I do hereby declare the same to be described as follows:

There is a portion of the bark termed by tanners the "ross," which contains little or no tannin, and is worthless to the tanner, and in fact, may be said to be injurious to skins or hides, as it contains a gummy matter, which, when incorporated with the hide, renders it hard and dark-colored, and, besides, it operates to retard the process of tanning the hide.

The object of my invention is to remove from the bark this ross, or outside portion. I accomplish it by first placing the slabs of bark in a closed box or vessel, and then subjecting them to the action of hot steam, introduced into the box and upon them until they are rendered soft or pliable, so as to be easily bent without being broken. After this I run each of them through a common planing-machine, so as to flatten it and plane off the ross or surplus part, and reduce the slab to an even thickness.

The planing-machine may be what is termed the "Woodworth Planing-Machine," having feed and pressure rollers, a bed, and a rotary planing-cylinder. The slab to be reduced is to be introduced between the feed-rollers, and by them be moved against the cutter-cylinder, as boards are usually treated by such. After this, the slabs so treated may be laid or piled and pressed together into a pile or bundle, which, after being bound with twigs, as a bundle of shingles, is prepared for the market, and ready for transportation and use.

The removal of the ross and the flattening of the bark renders it easy to pack it in a very much less compass than it could be in its natural and dry state. The steaming of it and the removal of the ross also prepares it for the extraction of the tannin to much better advantage.

What I claim as my invention is—

1. Bark prepared by being rendered flexile and flattened and reduced by means substantially as described.

2. The process, as hereinbefore specified, for preparing bark for transportation and use, as explained, such consisting in rendering the bark soft and flexile by moisture or steam, and next flattening it and removing from it the ross by means as set forth, or the equivalent thereof.

ALEXANDER APPLEBY.

Witnesses:
R. H. EDDY,
SAMUEL N. PIPER.